United States Patent

[11] 3,622,035

| [72] | Inventor | Charles A. Suter<br>130 Hayes Ave., Cuyahoga Falls, Ohio 44221 |
|---|---|---|
| [21] | Appl. No. | 845,450 |
| [22] | Filed | July 28, 1969 |
| [45] | Patented | Nov. 23, 1971 |

[54] PUNCTURE-RESISTANT FUEL CONTAINER
6 Claims, 7 Drawing Figs.

[52] U.S. Cl. .................................................. 220/63 A, 280/5 A
[51] Int. Cl. .................................................. B65d 25/14
[50] Field of Search ........................................ 220/63 A; 280/5 A; 296/34, 37

[56] References Cited
UNITED STATES PATENTS

| 2,395,556 | 2/1946 | Kopplin | 220/63 A |
| 2,401,627 | 6/1946 | Eger | 220/63 A |
| 2,425,514 | 8/1947 | Dasher et al. | 220/63 A |
| 2,438,965 | 4/1948 | Dasher | 220/63 A UX |
| 2,439,562 | 4/1948 | Cunningham | 220/63 A |
| 2,715,085 | 8/1955 | Boger | 220/63 A X |
| 2,754,992 | 7/1956 | Wilson | 220/63 A |
| 2,900,289 | 8/1959 | Harlan | 220/63 A X |

FOREIGN PATENTS

| 189,848 | 11/1922 | Great Britain | 220/63 A |

Primary Examiner—Joseph R. Leclair
Assistant Examiner—James R. Garrett
Attorneys—F. W. Brunner and Ronald P. Yaist ABSTRACT: A puncture-resistant fuel container for a vehicle including a rigid supporting structure, a fuel cell of flexible material disposed within the structure, and puncture-resistant members of a nonwoven fibrous material, such as nylon felt, positioned against the cell in at least the puncture prone areas thereof. The puncture-resistant members act to prevent sharp jagged metal objects from penetrating the flexible cell in crash situations.

PATENTED NOV 23 1971

INVENTOR.
CHARLES A. SUTER

BY

*R P Yaist*
ATTORNEY

PATENTED NOV 23 1971
3,622,035
SHEET 2 OF 3
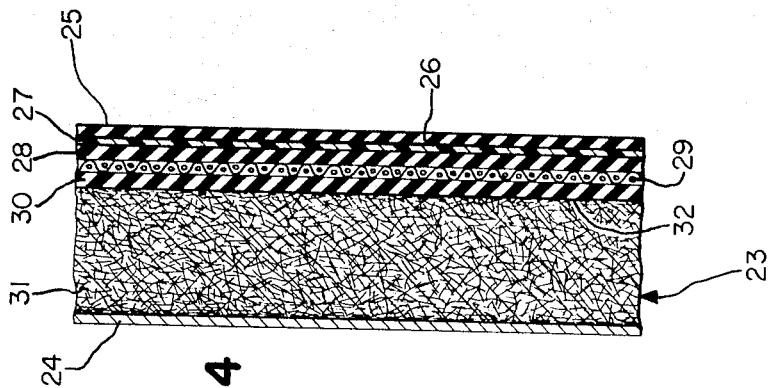
FIG. 4
FIG. 3
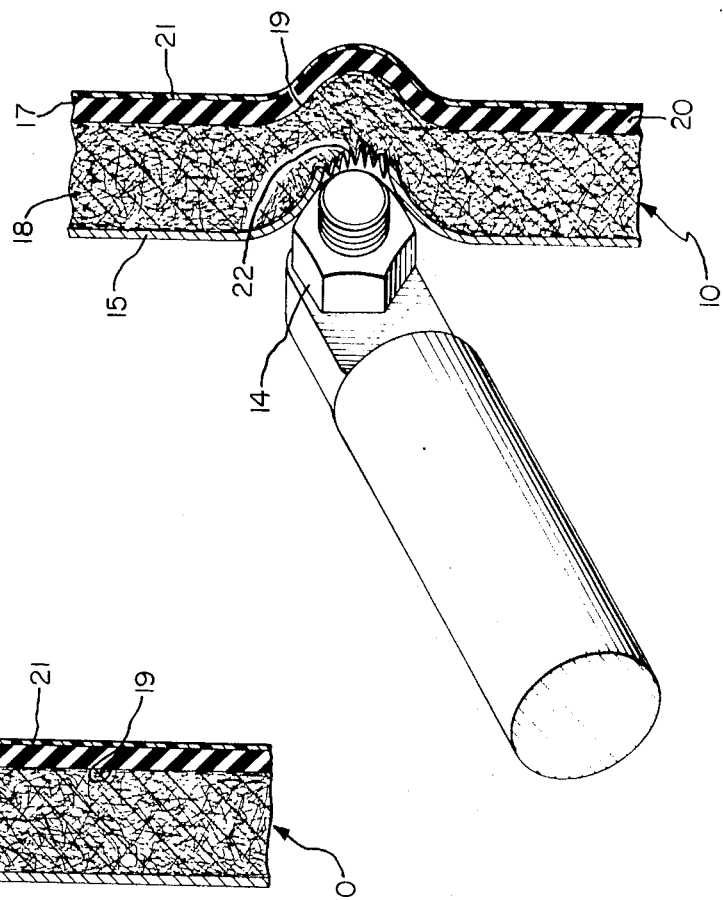
FIG. 2
INVENTOR.
CHARLES A. SUTER
BY
*RP Yaist*
ATTORNEY

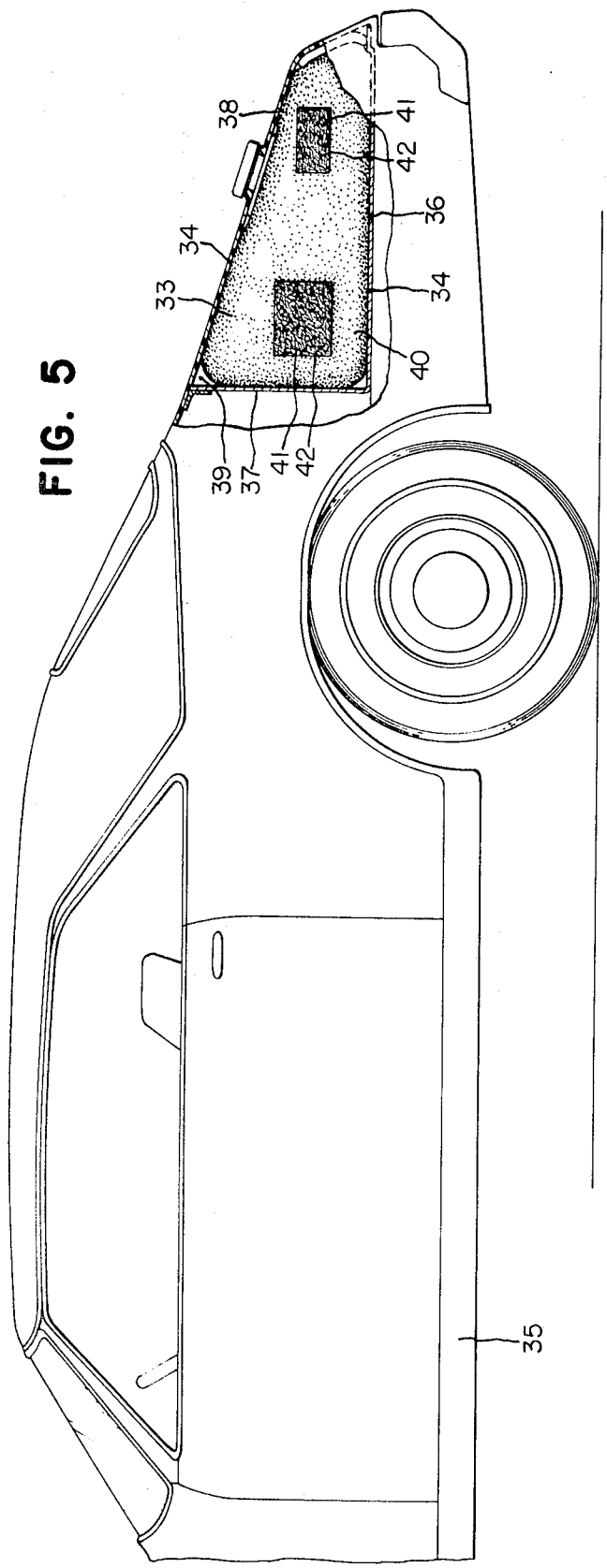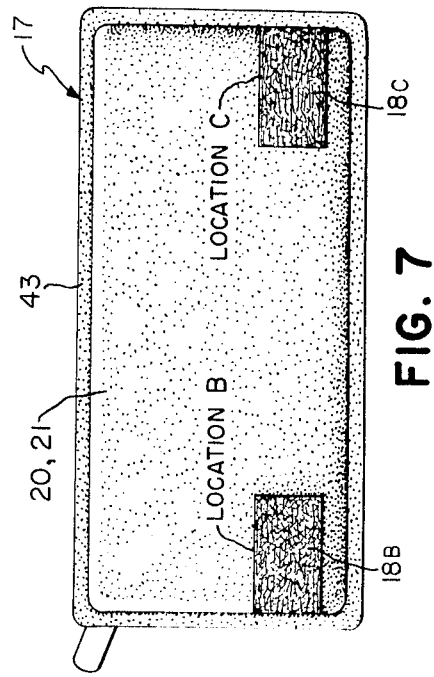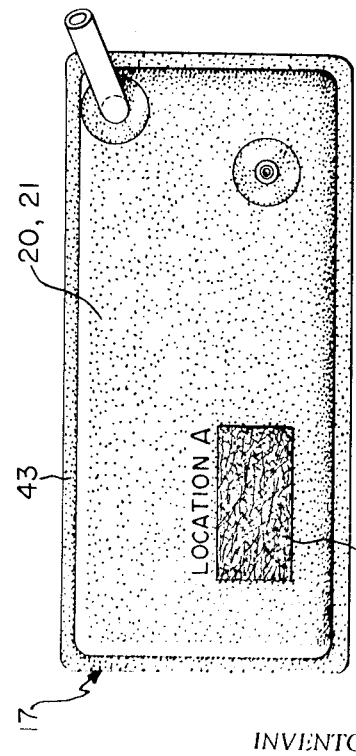

PUNCTURE-RESISTANT FUEL CONTAINER

This invention relates to fuel containers or tanks for vehicles and more specifically to a puncture-resistant fuel container with improved crash-resistant properties. This invention has particular application to a relatively low cost, lightweight flexible fuel tank or fuel cell which is specially adapted to resist penetration by sharp metal objects in crash situations.

It is well known that rigid fuel tanks tend to rupture upon impact, thus presenting a constant safety hazard to occupants of air and motor vehicles in which they are used. Flexible fuel tanks or fuel cells when properly designed inherently have less tendency to rupture dictating their increased use.

Accordingly, flexible fuel cells constructed of liquid impervious elastomeric material, such as nitrile rubber and polyurethane rubber, and sometimes containing textile fabric and fuel barrier films are widely used in certain commercial and military applications. These flexible fuel cells also show promise in automotive vehicle application. For instance, due to this inherent superiority, it is now a compulsory safety requirement that most racing vehicles be equipped with flexible or nonrigid fuel cells.

Flexible fuel cells are normally installed inside a rigid supporting structure having a cavity therein which provides support and maintains the shape of the cell during normal operation. This cavity is commonly formed by a metal tank which completely encloses the cell or an integral portion of the structure and body of the vehicle which is specially shaped to provide an area into which the flexible fuel cell is disposed. The rigid supporting structure which contains the flexible cell is necessarily associated with the vehicle structure. Therefore, in the area surrounding the supporting structure there are ordinarily one or more objects, such as stabilizer bars, tie rods, struts, differential housings, shock absorber mountings, or other like structures. When the vehicle is compressed in the crash situation, these objects either are violently rammed against the supporting structure of the fuel cell, or the supporting structure is rammed in like manner against these objects. Needless to say, considerable damage invariably results.

In general, the ability of the flexible-type fuel cell to deform and elongate permits it to survive the deformation caused by the impingement of these objects. However, in actual crashes of cars with flexible fuel cells it is found that often one of the above-described objects punctures the metal supporting structure surrounding the flexible fuel cell and that the jagged metal from the puncture cuts or tears the flexible fuel cell.

Furthermore, in attempting to combat this crash problem by the use of various structural and material changes during the production and fabrication of the fuel container an important consideration must be the overall size and weight. A bulky fuel tank will not permit efficient operation of the vehicle and in addition will greatly increase the cost of fabrication.

It is, therefore, an object of this invention to provide a puncture-resistant fuel container for a vehicle which will resist the penetration of objects associated with the vehicle in crash situations.

It is another object of this invention to provide a puncture-resistant fuel container which is of relatively low cost and of relatively lightweight construction.

Other objects and advantages of this invention will become apparent hereinafter as the description proceeds, the novel features, arrangements, and combinations being clearly pointed out in the specification as well as the claims thereunto appended.

In accordance with this invention it has been found that the areas of the vehicle fuel tank where puncture is most likely to occur during a crash or impact can be determined. This area can be determined, for example, by inspection of the vehicle or alternatively the drawings of the vehicle and by actual measurements taken after special crash tests. These areas for the purposes of this invention shall hereinafter be referred to as "puncture prone" areas.

Accordingly, the beforementioned objects of this invention are accomplished by providing a puncture-resistant fuel container comprising a rigid supporting structure associated with the vehicle structure and having a cavity therein formed by the supporting structure into which a fuel cell composed of a flexible material is disposed and providing at least one puncture-resistant member composed of a nonwoven fibrous or felt material which is positioned against the cell in at least each puncture prone area thereof with the member being of sufficient thickness to resist the penetration of the cell by the resulting jagged metal of the surrounding structures.

The objects and advantages of the invention will become more apparent with reference to the drawings in which:

FIG. 2 is an enlarged section taken through lines 2—2 of FIG. 1;

FIG. 3 is an enlarged section similar to FIG. 2 showing the reinforced puncture prone area of the fuel cell in the crash situation;

FIG. 4 is a modification of the invention shown in FIG. 2;

FIG. 5 is a side elevation of a portion of a vehicle illustrating another form of the invention shown in FIG. 1;

FIG. 6 is a front elevation of the flexible fuel cell of this invention shown independently of a rigid supporting structure; and FIG. 7 is a rear elevation of the flexible fuel cell shown in FIG. 6.

Figure 1:
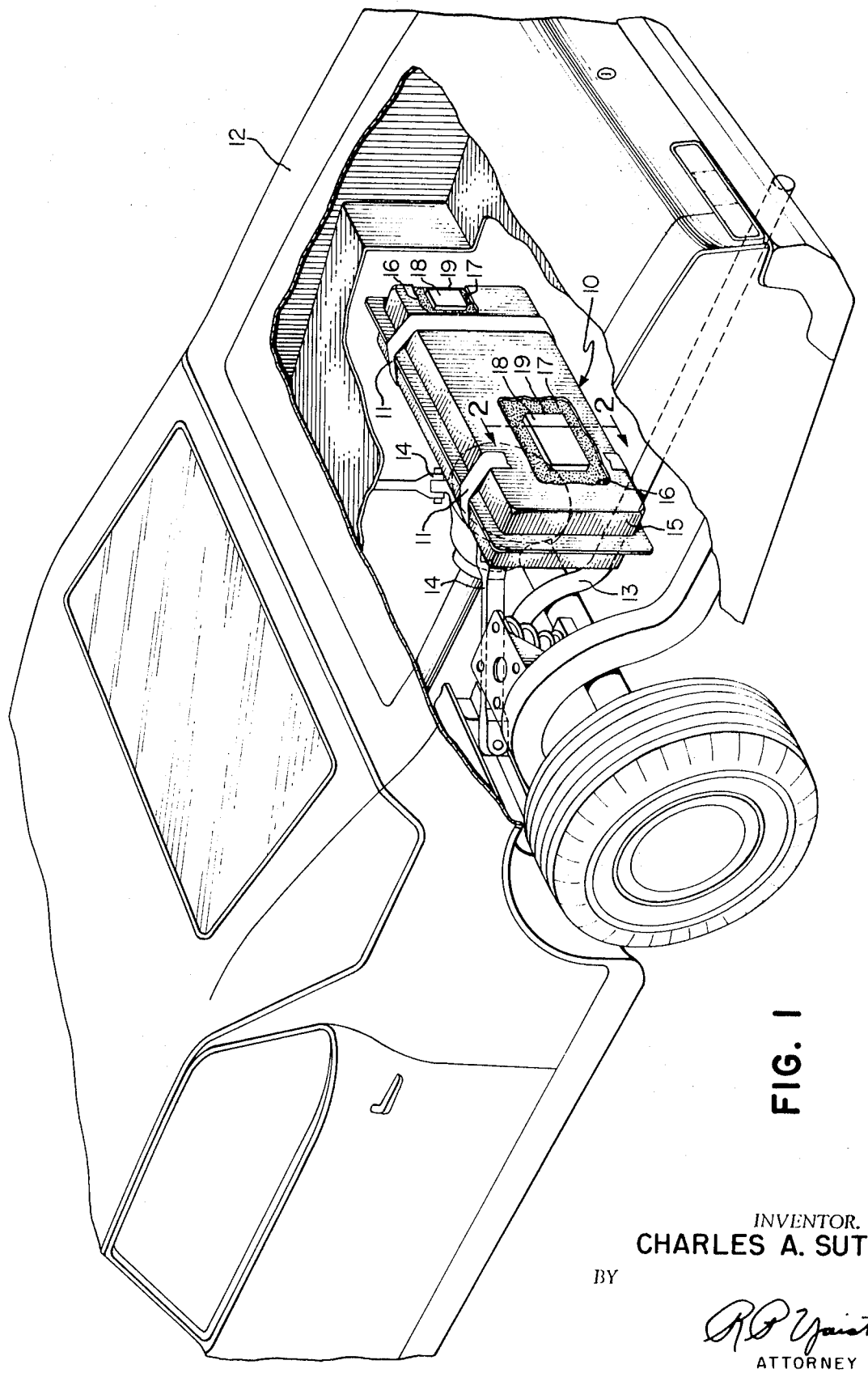
FIG. 1 is a perspective view showing the fuel container of this invention as installed in an automotive vehicle with parts broken away to more clearly illustrate the invention.

In the drawings, FIG. 1 shows the puncture-resistant fuel tank or container 10 of this invention as installed, for example, by means of strap fasteners 11 in the rear of an automotive vehicle 12. Some of the surrounding objects likely to cause damage to the container as a result of a crash or impact are also shown, such as the vehicle tailpipe 13 and the stabilizer or track bar and stud 14.

As shown, the container 10 includes a rigid supporting structure which in this instance is a sheet metal or rigid plastic tank 15 customarily used for this purpose. The tank 15 includes a cavity 16 into which a fuel cell 17 of flexible material is disposed. The cell 17 is accordingly completely enclosed by the tank 15. Puncture-resistant members 18 composed of nonwoven fibrous material in the form of pads or mats are positioned against the cell in puncture prone areas 19 thereof as determined by previous investigation. Of course it should be recognized that the entire outer peripheral surface of the cell 17 could also be covered by the member 18 if cost considerations are secondary, or if the puncture prone areas cannot be readily determined beforehand.

The detailed construction of the container 10 is best illustrated in FIG. 2 which shows a typical cross section of the container 10 in the puncture prone areas 19 thereof. The inner container structure is formed of a flexible bladder or fuel cell 17 which is preferably constructed of liquid impervious elastomeric materials. Representative of these materials are nitrile, polyurethane and neoprene rubbers. In this relatively simply constructed cell 17 for ordinary highway applications, the cell 17 includes an outside layer 20 of polybutadiene acrylonitrile rubber having a thickness range of from about 0.020 of an inch to about 0.060 of an inch, which is adhered to an inner fuel barrier layer 21 having a thickness range of about 0.0005 of an inch to 0.003 of an inch which comes in contact with the fuel contained in the cell 17. The barrier layer 21 is preferably composed of a nylon film but may also be formed from other well-known materials for this purpose, such as polyester or polyvinylidene chloride. The flexible fuel cells 17 may be formed into a composite structure by any manner well known in the art, for example, by building around a building form and curing or by mold forming. In addition, special methods, such as vacuum forming, can also be used.

The outside surface of the container 10 is formed by the rigid supporting structure or metal tank 15 typically having a wall thickness of about 0.024 of an inch. The puncture-resistant members 18 are positioned immediately adjacent to the metal tank 15 and are preferably in the form of felt pads or patches composed of a carded needle punch web of nylon staple fibers which may include a suitable binder. Nylon felt having a weight of at least 12 ounces per square yard is particularly suitable for this application. Because of its special construction features, it is extremely effective in preventing the penetration of sharp jagged metal objects into the flexible cell. The members 18 are preferably only loosely adhered to the cell 17 in order that the maximum degree of independent flexibility is provided between the member 18 and the cell 17 when objects strike against the member 18 in crash situations. This can be satisfactorily accomplished, for instance, by the use of ordinary adhesive tape or glue (not shown).

The functioning of the member 18 during crash situations is illustrated in FIG. 3. As shown, the outer shell or tank 15 of the container 10 is pierced by a metal object, such as a track bar stud 14 creating jagged metal 22 at the point of penetration of the tank 15. The member 18 resists the penetration of the track bar stud 14 and the jagged metal 22 of the outer shell or tank 15 of the container 10 and expands along with the flexible elastomer and barrier layers 20 and 21, respectively, of the cell 17, thus preventing puncture of the cell 17. The members 18 when in the form of a nylon felt pad should have a gauge or thickness in the range of about 0.125 of an inch to about 0.75 of an inch in order to provide the necessary puncture resistance with a minimum weight and bulk. However, if other nonwoven filamentary material is used, such as polyester, the pads should be of a greater thickness depending upon such factors as the type of fiber, staple length, type and amount of binder, if any, and degree of needling.

FIG. 4 illustrates the use of the puncture-resistant members of this invention in a more sophisticated fuel container, for instance, of the type employed in racing vehicles or in other applications where a high strength container is desirable. A container 23 again includes a suitable rigid supporting structure 24 but the flexible cell 25 in this case is composed of a laminate including a plurality of layers of elastomer and textile fabric in addition to including a fuel barrier layer.

The innermost layer 26 is composed of a fuel-resistant rubber, such as nitrile or polyurethane rubber which is adhered to a barrier layer 27 of a nylon solution or film by means of any suitable adhesive for this purpose well known in the art, such as nitrile rubber and phenolic resin. Another fuel-resistant rubber layer 28 similar to layer 26 is adhered in the same manner to the barrier layer 27 outwardly therefrom and a rubberized textile fabric or cloth layer 29 of cotton, nylon, rayon or polyester is positioned outwardly from the rubber layer 28 and similarly adhered thereto. The layer 30 of the laminate is also composed of a fuel-resistant rubber and is similarly adhered or bonded to the fabric layer 29 thereby completing the fuel cell construction. This laminated flexible fuel cell 25 is formed into a composite structure in any manner well known in the art, such as by plying up on a building form and curing in an autoclave unit.

The puncture-resistant member 31 is preferably loosely adhered to layer 30 in the puncture prone area 32 thereof preferably by means of ordinary adhesive tape or glue (not shown). The member 31 functions in the same way during the crash situation as discussed previously with reference to FIG. 3. Of course, it should be understood that many other fuel cell laminates and arrangements of the rubber and fabric layers are also possible with the laminate shown in FIG. 4 being only exemplary.

In accordance with the teachings of this invention, the rigid supporting structure of the fuel containers may take other forms as shown in FIG. 5. In this embodiment a fuel container 33 includes a rigid supporting structure 34 which is an integral portion of the structure and body of the vehicle 35. For example, connected structural steel sections 36 and 37 interiorly of the vehicle body and a steel or fiberglass section 38 forming the outer surface of the body combine to define a cavity 39 in the rear of the vehicle 35 into which a flexible fuel cell 40 is disposed. The fuel cell includes puncture-resistant members 41 either in the form of nonwoven fibrous material adhered to the puncture prone areas 42 of the cell 40 as shown or a layer of such fibrous material covering the entire outer surface of the cell 40.

It should be apparent to those skilled in the art that by the practice of this invention a low cost, lightweight fuel container is provided which will resist puncture during crash or impact situation. Furthermore, it should also be apparent that because of this invention, it is now possible to place fuel containers in various locations in a vehicle structure without the probability of rupture and the resultant imminent danger to human life as existed heretofore.

The following illustrative example is set forth to further exemplify the objects and advantages of this invention. The parts and percentages are by weight unless otherwise indicated.

EXAMPLE I

In constructing the flexible cells of this invention, as shown in FIGS. 6 and 7, two sheets of a calendered flexible material having a thickness of about 0.060 of an inch were prepared having the following composition:

| Compound | Parts |
| --- | --- |
| Butadiene-acrylonitrile copolymer (1) | 100 |
| Zinc oxide | 5 |
| Sulfur | 1.5 |
| Magnesium carbonate | 2.25 |
| Carbon black (fine thermal furnace and HAF) | 112 |
| Dioctyl phthalate | 17 |
| Aryl-p-phenylene diamines | 0.5 |
| Polyvinyl chloride resin (2) | 43 |
| Adipic acid ester plasticizer (3) | 35 |
| Accelerator-mixture of a benzothiazole sulfonamide and a benzothiazole disulfide | 1.75 |
| Total | 318.0 |

(1) obtained as Chemigum N-7 from The Goodyear Tire & Rubber Company.

(2) obtained as Pliovic AO-3 from The Goodyear Tire & Rubber Company; and (3) obtained as Adipal BCA from the F. M. C. Corporation.

To the flexible sheets was adhered a transparent thermoplastic film of nylon of the nylon-6 type made from a polymer of ε-caprolactam having a thickness of about 0.001 of an inch (obtained as Capran from The Allied Chemical Company) with a curable butadiene-acrylonitrile rubber adhesive labeled as rubber adhesive (A). The durable rubber adhesive had the following composition:

| | |
| --- | --- |
| Butadiene-acrylonitrile copolymer (4) | 72 |
| Zinc oxide | 3.5 |
| Sulfur | 1 |
| Carbon black (SRF) | 21 |
| Accelerator (a benzothiazole disulfide) | 0.5 |
| Phenolic Resin | 83.5 |
| Methyl ethyl ketone | 549 |
| Total | 730.5 |

(4) obtained as Hycar 1001 from The B. F. Goodrich Company. In the practice of this invention, for strengthening and barrier purposes, the flexible sheets can contain fibrous materials either of the nonwoven type or of the extensible woven type. Various fibers can be used, such as nylon, cotton, polyester, and cellulose derivatives, such as rayon.

The sheets were vacuum formed by use of a suitable metal mold and were adhered together by use of adhesive (A) to define an enclosed cavity. The combined sheets were then cured in a hot air oven at a temperature of about 120° C. for about 1 ½ hours to form the substantially rectangular fuel cell 17 having a peripheral edge seam 43 where the sheets were adhered together, as shown in FIGS. 6 and 7. The flexible sheets formed the elastomeric layer 20, and the nylon film formed the barrier layer 21, as shown in FIG. 2. Two such cells were produced having dimensions after vacuum forming and curing of 41 by 15 by 12 inches with a wall thickness of about 0.040 of an inch. These cells after curing were removed from the mold filled with gasoline and determined to be leak free. These cells will be referred to as cell Nos. 1 and 2.

Cell No. 1 was then enclosed in a rigid supporting structure in the form of a sheet metal fuel tank having a wall thickness of about 0.024 of an inch. This cell contained no puncture-resistant pads. The container was then installed in the rear of an automotive vehicle in the manner shown in FIG. 1. The vehicle was subjected to a rear impact crash test with the impact provided by a moving barrier traveling at a speed of about 30 miles per hour. An inspection of the container after the test revealed that both the metal tank and flexible cell No. 1 were punctured and the fuel contents of the cell leaked profusely. It was observed that the punctures in cell No. 1 were caused by the action of the track bar and stud and jagged metal of the tank, and in addition by the buckling or folding in of the metal tank edges. Measurements were taken of both the front and rear surfaces of cell No. 1 to determine the puncture prone areas.

The corresponding areas of cell No. 2 were then measured and marked and nylon felt pads 18 of the character described previously (obtained from West-Point Pepperrell, Inc.) were loosely adhered by means of ordinary adhesive tape over these areas thereby forming the reinforced puncture prone areas, as shown in FIG. 2. The pads were substantially square having length and width dimensions of about 8 by 8 inches with a thickness of about 0.320 of an inch and weighed about 33 ounces per square yard.

As shown in FIG. 6, one such pad 18A was placed in location A on the front surface of cell No. 2 (designated as numeral 17) in a position opposite the track bar stud of the vehicle. Location A was chosen in anticipation of the track bar stud striking and penetrating the metal tank in a location corresponding to the location of the penetration of cell No. 1 in the first crash test.

During the actual test, the metal tank was punctured at this point but no puncture of the flexible cell 17 occurred as will be hereinafter discussed.

FIG. 7 shows the rear surface of the cell 17 where one nylon pad 18B was placed at location B at the extreme left edge of the cell 17 in anticipation of an edge buckle which occurred in a corresponding location of cell No. 1. Another nylon pad 18C was placed at location C at the extreme right edge of the cell 17 in anticipation of another edge buckle which occurred in a corresponding location of cell No. 1.

After the nylon pads 18A, 18B, and 18C were in place, cell No. 2 was enclosed within a sheet metal tank and installed in the rear of a vehicle in the same manner as cell No. 1. This is also illustrated by reference to FIG. 1. The vehicle was subjected to the same rear impact crash test at approximately the same speed and under approximately the same conditions as previously described. After the test, an inspection indicated that the metal tank was again severely damaged and had burst open along its upper seam due to the failure of spot welds. However, unlike cell No. 1 which was badly damaged, cell No. 2 satisfactorily withstood the impact and resisted the penetration of surrounding metal objects. For example, as previously mentioned, it was specifically observed that the track bar stud of the vehicle (with the rubber cap or snubber removed) struck one puncture prone area of the cell reinforced by a nylon pad (location A of FIG. 6) without puncturing or rupturing the cell. The functioning of the pad in this situation is illustrated by reference to FIG. 3.

At this point, it is again well to emphasize that the location for the puncture prone areas of the flexible cells will quite likely vary with each type and make of vehicle and accordingly the location of the puncture prone areas will vary. Consequently it may be necessary and more practical to provide that the nonwoven fibrous member cover substantially the entire outer surface of the cell.

While certain representative embodiments and details have been shown for the purpose of illustrating the invention, it will be apparent to those skilled in the art that various changes and modifications may be made therein without departing from the spirit or scope of the invention.

What is claimed is:

1. A puncture-resistant fuel container for an automotive vehicle or the like comprising:
   a. a rigid supporting structure associated with the vehicle structure and having a cavity therein;
   b. a fuel cell composed of flexible fuel-resistant material disposed within the cavity of said supporting structure, said cell being formed of a laminated sheet including a layer of vulcanized elastomeric material and at least one barrier layer of fuel-resistant material interiorly thereof, which layer is contacted by the fuel contained in the cell;
   c. at least one puncture-resistant member composed of a flexible, penetration-resistant nonwoven fibrous web of high-strength synthetic filamentary material selected from at least one of the group consisting of nylon and polyester, said member being positioned against said cell and loosely adhered thereto in at least each puncture prone area thereof wherein the probability of damage thereto during crash situations is high due to possible penetration by said supporting structure and the vehicle structure, said member having a weight of at least 12 ounces per square yard and a thickness of at least 0.125 of an inch in order to resist the penetration of said cell by said structures.

2. A container as claimed in claim 1, wherein said cell is composed of a laminated sheet including a plurality of layers of textile fabric and elastomeric material.

3. A container as claimed in claim 1, wherein said puncture-resistant member is a felt pad composed of a carded needle punched web of nylon staple fibers.

4. A container as claimed in claim 1, wherein said supporting structure is a metal tank.

5. A container as claimed in claim 1, wherein said supporting structure is an integral part of the vehicle structure.

6. In a fuel tank for an automotive vehicle or the like including the combination of:
   a. a rigid supporting structure associated with the vehicle structure and having a cavity therein;
   b. a fuel cell composed of flexible fuel-resistant material disposed within the cavity of said supporting structure, said cell being composed of vulcanized elastomeric material including at least one barrier layer of fuel-resistant material interiorly thereof; and
   c. at least one puncture-resistant member composed of a flexible, penetration-resistant, nonwoven fibrous web of high strength synthetic filamentary material selected from at least one of the group consisting of nylon and polyester, said member being positioned against said cell and loosely adhered thereto in at least each puncture prone area thereof wherein the probability of damage thereto during crash situations is high due to possible penetration by said supporting structure and the vehicle structure, said member having a weight of at least 12 ounces per square yard and a thickness of at least 0.125 of an inch in order to resist the penetration of said cell by said structures.

* * * * *

PO-1050
(5/69)

UNITED STATES PATENT OFFICE
CERTIFICATE OF CORRECTION

Patent No. 3,622,035        Dated November 23, 1971

Inventor(s) Charles A Suter

It is certified that error appears in the above-identified patent and that said Letters Patent are hereby corrected as shown below:

Column 6, line 39, after "and" insert --vulcanized--.

Signed and sealed this 4th day of July 1972.

(SEAL)
Attest:

EDWARD M.FLETCHER,JR.          ROBERT GOTTSCHALK
Attesting Officer              Commissioner of Patents